US010436330B2

(12) United States Patent
Hawa

(10) Patent No.: US 10,436,330 B2
(45) Date of Patent: Oct. 8, 2019

(54) NON-RISING STEM GLOBE VALVE

(71) Applicant: Hawa Valves (India) Private Limited, Navi Mumbai (IN)

(72) Inventor: Javed Anwar Hawa, Mumbai (IN)

(73) Assignee: Hawa Valves (India) Private Limited, Navi Mumbai (IN)

( * ) Notice: Subject to any disclaimer, the term of this patent is extended or adjusted under 35 U.S.C. 154(b) by 0 days.

(21) Appl. No.: 15/172,833

(22) Filed: Jun. 3, 2016

(65) Prior Publication Data
US 2016/0356385 A1    Dec. 8, 2016

(30) Foreign Application Priority Data
Jun. 4, 2015    (GB) .................................... 1509689.4

(51) Int. Cl.
| F16K 1/50 | (2006.01) |
| F16K 1/44 | (2006.01) |
| F16K 39/02 | (2006.01) |
| F16K 31/50 | (2006.01) |

(52) U.S. Cl.
CPC ................ F16K 1/50 (2013.01); F16K 1/443 (2013.01); F16K 31/508 (2013.01); F16K 39/024 (2013.01)

(58) Field of Classification Search
CPC ....... F16K 1/443; F16K 31/508; F16K 39/024
USPC ............ 251/274, 264, 266, 309, 310, 30.03, 251/30.04, 282; 137/469
See application file for complete search history.

(56) References Cited

U.S. PATENT DOCUMENTS

| 1,618,844 A |   | 2/1927 | Owen |   |
|---|---|---|---|---|
| 4,915,353 A | * | 4/1990 | Danko | ...................... F16K 7/16 137/315.4 |
| 6,561,480 B1 | * | 5/2003 | Komiya | ..................... F16K 1/38 251/122 |
| 8,840,081 B2 | * | 9/2014 | Bill | ........................ F16K 31/408 251/28 |
| 2008/0149874 A1 | * | 6/2008 | Fukano | ..................... F16K 7/16 251/264 |
| 2010/0294962 A1 | * | 11/2010 | Bill | ........................ F16K 31/408 251/30.01 |

(Continued)

FOREIGN PATENT DOCUMENTS

| GB | 628162 A | 8/1949 |
|---|---|---|
| GB | 1368025 A | 9/1974 |

OTHER PUBLICATIONS

United Kingdom Intellectual Property Office, Search Report in United Kingdom Patent Application No. GB1509689.4, dated Jul. 13, 2015, 1 page.

Primary Examiner — Kevin F Murphy
Assistant Examiner — Kelsey E Cary
(74) Attorney, Agent, or Firm — Leydig, Voit & Mayer, Ltd.

(57) ABSTRACT

A valve assembly includes a valve body with an upstream inlet and a downstream outlet and a valve element which is engageable with and disengageable from a valve seat to open and close the valve assembly. The valve body defines a bore with an axis for receiving the valve element. At least part of the bore and of the valve element have cooperating shapes which permit axial movement of the valve element in the bore and prevent rotation of the valve element in the bore. A rotatable actuator is provided, with a connection between the actuator and the valve element operable to convert rotation of the actuator into axial translation of the valve element.

5 Claims, 5 Drawing Sheets

(56) References Cited

U.S. PATENT DOCUMENTS

| 2013/0277593 | A1* | 10/2013 | Huang | F16K 5/08 |
| | | | | 251/318 |
| 2015/0322931 | A1* | 11/2015 | Weh | B60T 8/4018 |
| | | | | 417/415 |
| 2015/0330517 | A1* | 11/2015 | Lin | F16K 7/12 |
| | | | | 251/331 |

* cited by examiner

NON-RISING STEM GLOBE VALVE

CROSS-REFERENCE TO RELATED APPLICATIONS

This application claims priority to United Kingdom Application No. 1509689.4, filed Jun. 4, 2015, which is incorporated by reference herein in its entirety for all purposes.

FIELD AND BACKGROUND OF THE INVENTION

The present invention provides a high pressure globe valve with a non-rising stem design. Traditionally throttling applications in the hydrocarbon manufacture process and in well-head operations used gate valves to alter the flow of fluid. Recently there has been a trend to switch to using globe valves rather than gate valves in these applications.

While gate valves may be operated by both a rising or a non-rising stem, typically globe valves only operate with a rising valve stem. The stem acts like a piston to move outwards laterally from the pressure containing valve boundary and as such any minor leakage paths can be amplified. This can cause excessive emission of the pressurised fluid, which may be dangerous for anyone in the vicinity. The rising stem head also requires more space to operate, as the area above the valve stem must be left free for the stem to rise into.

SUMMARY OF THE INVENTION

The present invention provides a valve assembly comprising a valve body with an upstream inlet and a downstream outlet and a valve element which is engageable with and disengageable from a valve seat to open and close the valve assembly, the valve body defining a bore with an axis for receiving the valve element, at least part of the bore and of the valve element having cooperating shapes which permit axial movement of the valve element in the bore and prevent rotation of the valve element in the bore, a rotatable actuator, and a connection between the actuator and the valve element operable to convert rotation of the actuator into axial translation of the valve element.

This results in a globe valve with a non-rising actuator, which prevents minor leakage paths by being amplified by movement of the actuator. Hence dangerous leakage of fluids and media is avoided.

In preferred embodiments the bore and the valve element are substantially polygonal in cross section. Most preferably the bore and the valve element are substantially hexagonal.

In some embodiments the actuator comprises a rod located in the bore, and the connection between the actuator and the valve element comprises cooperating threads formed on the rod and the valve element.

Preferably the rod has external threads, and the valve element has an opening with internal threads.

Preferably the valve assembly further comprises a seal between the rod and the valve body.

In a preferred embodiment the valve assembly further comprises a second valve element and second valve seat wherein the assembly is configured to provide a first flow path from the inlet to the outlet when the first valve element is disengaged from the first valve seat and to provide a second flow path from the inlet to the outlet when the second valve element is disengaged from the second valve seat, wherein upon rotation of the actuator to open the valve, initially the first valve element disengages from the first valve seat to permit fluid flow through the first flow path in order to equalise upstream and downstream pressure on the second valve element, and further rotation of the actuator disengages the second valve element from the second valve seat to permit fluid flow through the second flow path.

This allows the valve assembly to open without an excessive force input even when high pressure fluid is flowing through the valve in a pressure locking scenario.

BRIEF SUMMARY OF THE DRAWINGS

The invention will now be described in detail, by way of example only, with reference to the accompanying drawings in which.

DESCRIPTION OF EMBODIMENTS

Figure 1:
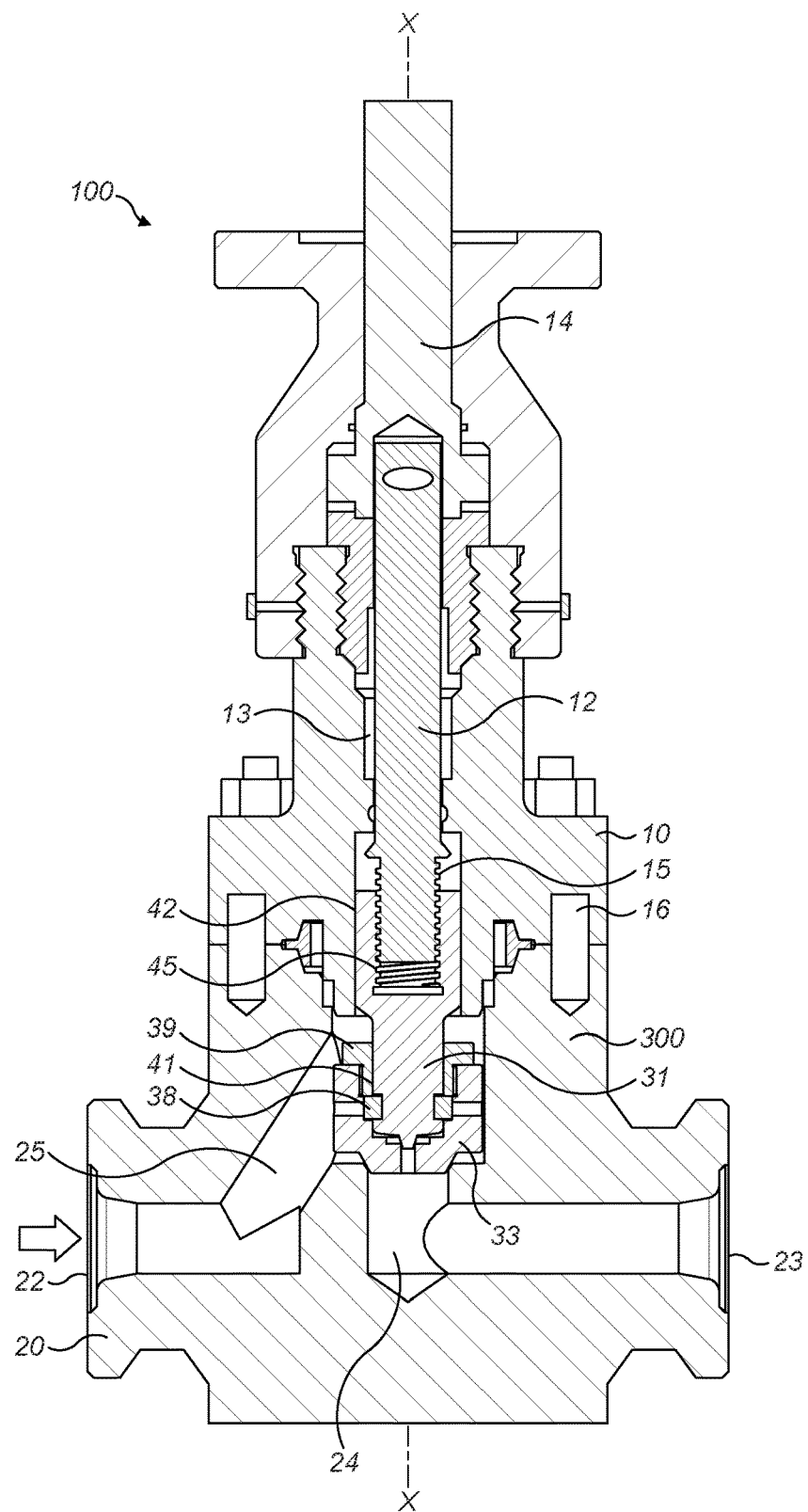
FIG. 1 is a cross-section of a globe valve assembly according the present invention.

A first embodiment of the present invention is shown in the globe valve assembly 100 depicted in FIGS. 1 to 5. For the purposes of the following description, the upper end of the valve assembly 100 is considered to be towards the top of FIG. 1, and the lower end towards the bottom of FIG. 1. A valve stem 12 is mounted within an upper valve body part, which in the present embodiment consists of a valve bonnet 10, such that the valve stem 12 is able to rotate when driven by a yoke sleeve 14 which is attached to the valve stem 12 at an upper end. Typically the rotation is driven by a handle attached to the yoke sleeve 14, but the rotation may be driven by any suitable mechanical or electrical means.

The lower end of the valve stem 12 is provided with a threaded section 15. Stem packing 13 is provided to form a seal between the valve bonnet 10 and the valve stem 12 in order to prevent material leaking from the valve assembly 100. The valve bonnet 10 is attached at its lower end to a main valve body 20, for example by dowel pins 16. The main valve body 20 comprises a valve inlet 22 and a valve outlet 23. When the valve assembly 100 is in an open position, the valve inlet 22 and outlet 23 are in fluid communication with each other via passageways in the valve body 20. Globe valve elements 300 are mounted in these passageways in order to selectively block the passageways to allow or deny the flow of fluid through the valve assembly 100. Between the valve inlet 22 and the globe valve elements 300 is an upstream chamber 25, and between the globe valve elements 300 and the valve outlet 23 is a downstream chamber 24. The globe valve elements 300 are attached to the lower end of the valve stem 12.

Figure 2:
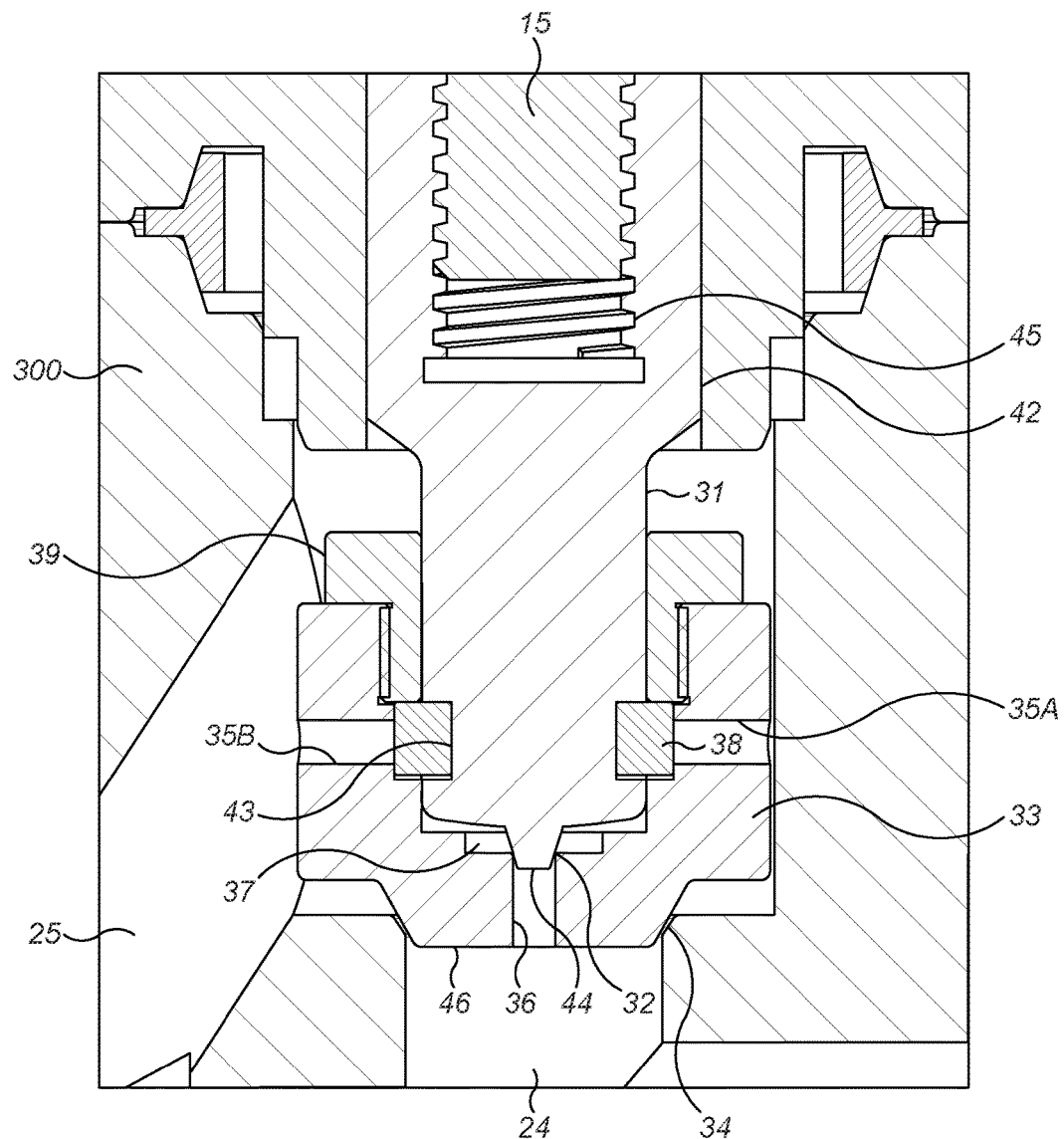
FIG. 2 is an enlarged view of the valve seat region of FIG. 1, in the closed position.

The globe valve elements 300 are depicted in FIG. 2, and comprise a first valve element 31 which is generally cylindrical at its lower end 41 with a protruding nose 44 which sits on a first valve seat 32 to prevent the flow of a fluid through one flow path in the assembly 100. The first valve seat 32 is disposed on a second valve element 33 which in the present embodiment is a valve disc. The second valve element 33 is in form of an annular collar comprising a central passageway 36 which has the first valve seat 32 at its upper end. The second valve element 33 surrounds the lower end of the first valve element 31. This second valve element 33 also comprises a nose 46 projecting from its lower end, which sits on a second valve seat 34 formed on valve body 20 at the entrance to the downstream chamber 24. The second valve element 33 prevents a flow of fluid through a second flow path through the assembly 100. The central passageway 36 extends through this nose section 46.

The valve assembly 100 defines a first axis X as shown in FIG. 1. The axis X extends through the length of the valve assembly 100 and the valve elements 31, 33 are able to move along this axis X toward and away from the valve seats 32, 34.

While in the illustrated example the first and second valve seats 32, 34 are substantially concentrically aligned when viewed down the first axis X, this is not a requirement. Indeed embodiments are envisioned wherein the first and second valve seats 32, 34 are offset from one another in this direction.

Figure 5:
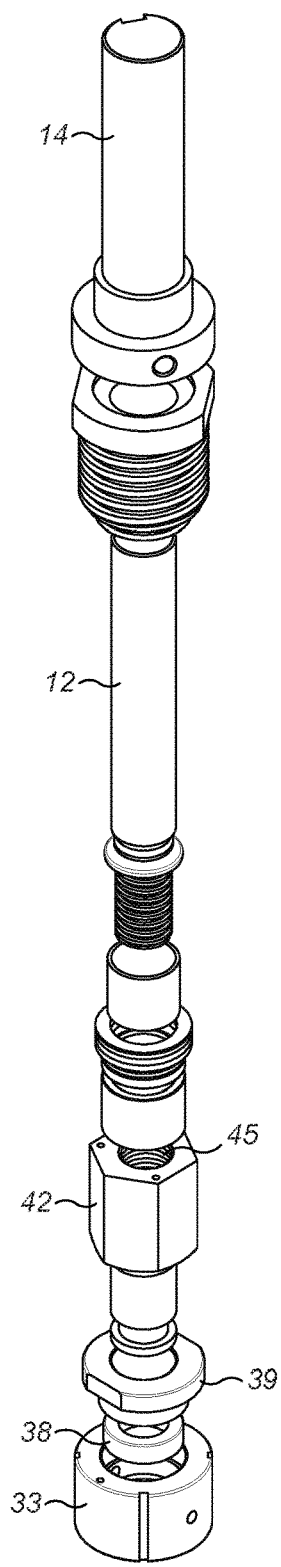
FIG. 5 is an exploded view of the interior elements of the globe valve.

The first valve element 31 further comprises an upper section 42 which is substantially hexagonal in cross-section and can be best seen in FIG. 5. This hexagonal section 42 is mounted in a hexagonal guideway in the valve bonnet 10 such that it is unable to rotate. The hexagonal section 42 comprises central bore 45 which is threaded to engage with the threaded section 15 of the valve stem 12.

While the upper section 42 and the guideway are hexagonal in the present embodiment, any shape suitable to restrict the rotation of the first valve element 31 may be used. In particular the two may each be polygonal in cross section. In alternative embodiments one of the upper section 42 or the guideway may comprise an axial groove and the other component may comprise a projection shaped to travel in this groove to prevent rotation.

Thus, when the valve stem 12 is driven to rotate by the yoke sleeve 14 the rotational motion is translated into axial motion of the first valve element 31. In this manner the first valve element 31 is able to move toward and away from the downstream fluid chamber 24. As such the valve stem 12 does not rise or lower with the opening of the valve assembly 100.

The second valve element 33 is connected to the first valve element 31 via a locking disc nut 39. The first valve element 31 comprises an annular groove 43 in which is partially housed a split ring 38. The split ring 38 protrudes from the outer periphery of the first valve element 31 and engages between the disc nut 39 and the second valve element 33.

Figure 4:
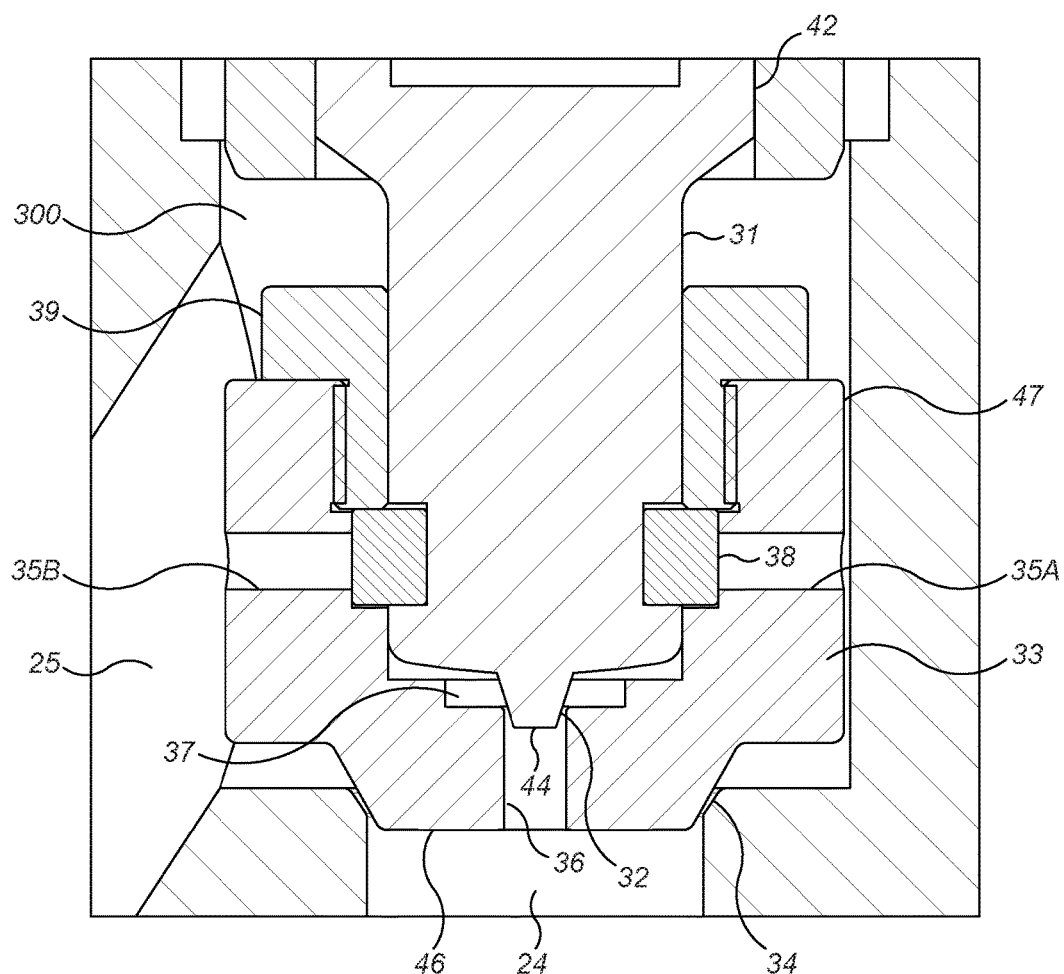
FIG. 4 is an enlarged view of the valve seat region of FIG. 1, which shows the valve in a partially open configuration.

As such, when the first valve element 31 moves toward and away from the downstream fluid chamber 24, the second valve element 33 is also moved towards or away from the downstream fluid chamber 24. A small clearance gap 47 is provided between the outer surface of the second valve element 33 and the valve body 20, as shown in FIG. 4.

Substantially aligned with the split ring 38 are a plurality of bores 35A, 35B which extend radially through the second valve element 33. In the present embodiment two bores are envisioned, but the second valve element 33 may be provided with any suitable number of bores.

Figure 3:
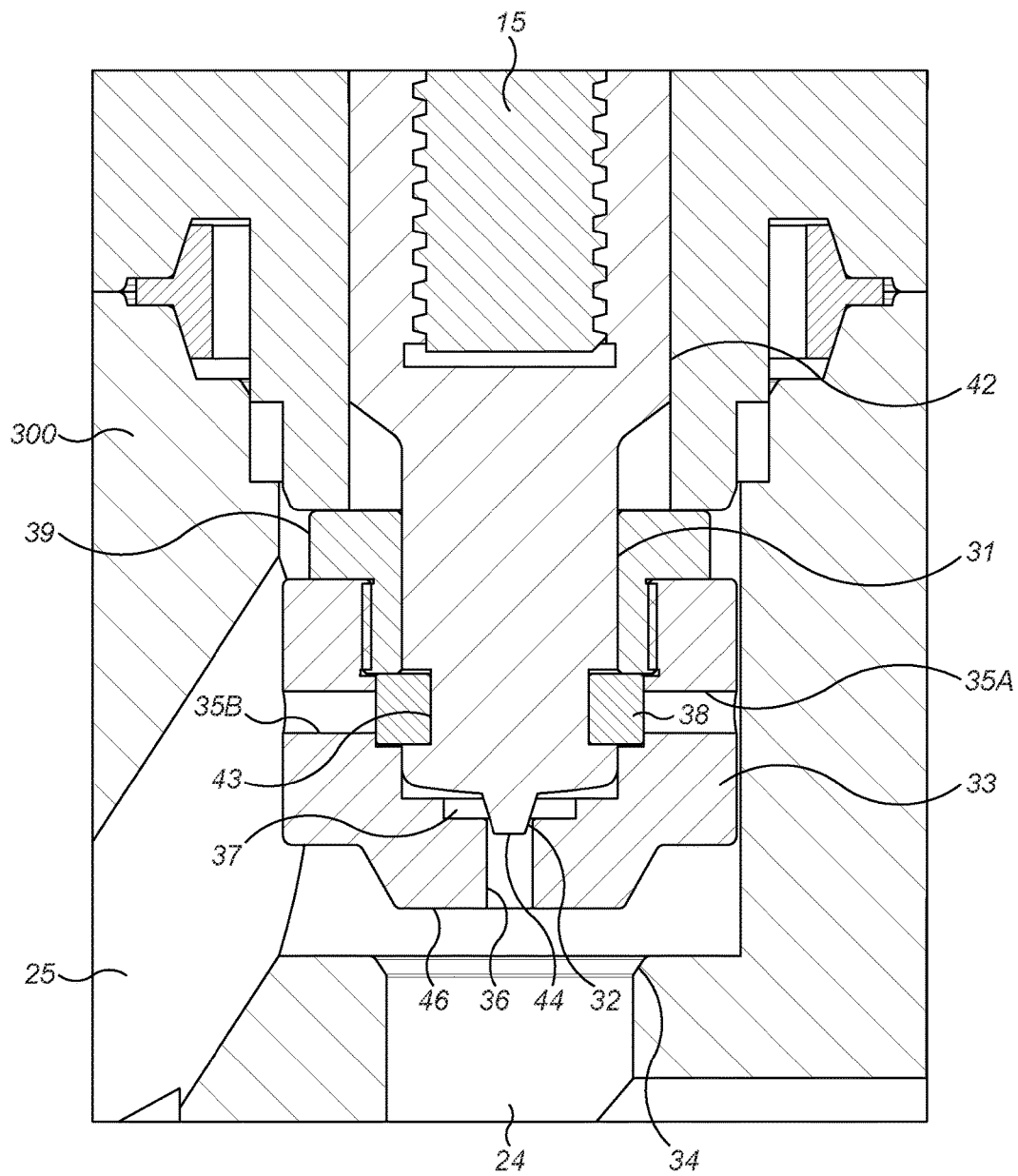
FIG. 3 is an enlarged view of the valve seat region of FIG. 1, in the fully open position.

The operation of the valve assembly 100 will now be described with reference to FIGS. 2 to 4.

In the closed position show in FIG. 2, a large pressure may form in the upstream chamber 25, and act on the valve elements 300. This can make opening the valve assembly 100 difficult, as the initial movement of the valve elements 300 has to act against this pressure. In particular the large second valve element 33 may be hard to move as it comprises relatively large faces exposed to the pressurised fluid.

As such, when the valve stem 12 is rotated the second valve element 33 will resist movement away from the second valve seat 34. However, enough play is provided between the split ring 38 and the valve elements 31, 33 that a small clearance is formed in this region. Thus, some fluid which is present in the radial bores 35A, 35B is able to leak through this small clearance into a chamber 37 defined between the two valve elements 31 and 33.

This fluid in the chamber 37 will act on the lowermost face of the first valve element 31. Therefore, a relatively small force provided by the rotating valve stem 12 will be sufficient to slightly unseat the first valve element 31 from the first valve seat 32. FIG. 4 shows the first valve element 31 in this partially open position.

The first valve element 31 is able to disengage from the first valve seat 32 despite the resisting pressure as it has less surface area exposed to the upstream chamber 25 on which the fluid pressure can act to resist opening, and hence the resisting forces acting on it are reduced.

With the nose 44 of the first valve element 31 disengaged from the first valve seat 32, high pressure fluid is able to flow through the bores 35A, 35B, past the split ring 38, into the chamber 37 between the valve elements 31, 33 and then through passageway 36 into the downstream chamber 24. This will substantially equalise the pressure across the second valve element 33. This is the first flowpath through the valve assembly 100.

With the pressure either side of the globe valve elements 300 substantially equalised, the pressure lock force acting to bias the larger second valve element 33 towards the closed position will be significantly reduced or eliminated. Therefore, excessive force is no longer required in order to fully disengage the second valve element 33 from the second valve seat 34. Thus, further rotation of the valve steam 12 will further unseat the second valve element 33. The valve assembly 100 can thus be fully opened to the position shown in FIG. 3 by further rotation of the yoke sleeve 14, in order to permit flow of fluid through the valve assembly 100. This is the second flowpath through the valve assembly 100. The fluid passing from the upstream chamber 25 to the downstream chamber 24 past the second valve element 33 will act on the lower face of the second valve element 33 and tend to close the clearance between the first and second valve elements 31, 33. Thus the nose 44 of the first valve element 31 will re-engage with the first valve seat 32.

While the present invention has been described for a valve assembly 100 with a first a second valve seat 31, 32, it will be appreciated that it is applicable to any globe valve. In particular, the present invention is applicable to conventional single valve element and single valve seat globe valves.

Although the interface between the valve stem 12 and the first valve element 31 is described as threaded above, this is only an exemplary embodiment. Any coupling which translates rotational movement of the valve stem 12 into linear movement of the first valve element 31 may be used.

In this manner the present invention is able to provide a globe valve assembly which is operated with a non-rising stem to prevent leakage paths being amplified. The invention also requires less space above the valve assembly 100 as any operating handle will not have to rise with the valve elements 300.

The invention claimed is:

1. A high pressure valve assembly suitable for use in throttling applications in a hydrocarbon manufacture process and in well head operations, the valve assembly comprising:
   a valve body including
      a lower main valve body,
      an upper valve bonnet attached at its lower end to the lower main valve body,
      a valve seat,
      an upstream inlet, and
      a downstream outlet;
   a rotatable actuator comprising a rod with a flange extending radially from the rod, the flange being integrally formed with the rod;
   a valve element which is engageable with and disengageable from the valve seat to open and close the valve assembly;
   a seal between the valve bonnet and the actuator; and
   a connection between the actuator and the valve element operable to convert rotation of the actuator into axial translation of the valve element,
   the upper valve bonnet defining a bore with an axis, the bore having a shoulder at its upper end, the flange of the rotatable actuator arranged to engage the shoulder of the bore to retain the rotatable actuator within the valve body, at least a portion of the valve element being slidably disposed within and against the bore, at least part of the bore and of the valve element having engaging shapes which permit axial movement of the valve element in the bore and prevent rotation of the valve element in the bore, wherein the bore and the valve element are hexagonal in cross section.

2. A high pressure valve assembly as claimed in claim 1, wherein the actuator comprises a rod located in the bore, and the connection between the actuator and the valve element comprises cooperating threads formed on the rod and the valve element.

3. A high pressure valve assembly as claimed in claim 2, wherein the rod has external threads, and the valve element has an opening with internal threads.

4. A high pressure valve assembly as claimed in claim 1, further comprising a second valve element and second valve seat wherein the assembly is configured to provide a first flow path from the inlet to the outlet when the first valve element is disengaged from the first valve seat and to provide a second flow path from the inlet to the outlet when the second valve element is disengaged from the second valve seat, wherein upon rotation of the actuator to open the valve, initially the first valve element disengages from the first valve seat to permit fluid flow through the first flow path in order to equalise upstream and downstream pressure on the second valve element, and further rotation of the actuator disengages the second valve element from the second valve seat to permit fluid flow through the second flow path.

5. A high pressure valve assembly suitable for use in throttling applications in a hydrocarbon manufacture process and in well head operations, the valve assembly comprising:
   a valve body including
      a lower main valve body,
      an upper valve bonnet attached at its lower end to the lower main valve body,
      a valve seat,
      an upstream inlet, and
      a downstream outlet;
   a rotatable actuator comprising a rod with a flange-extending radially from the rod;
   a valve element which is engageable with and disengageable from the valve seat to open and close the valve assembly;
   a seal between the valve bonnet and the actuator; and
   a connection between the actuator and the valve element operable to convert rotation of the actuator into axial translation of the valve element,
   the upper valve bonnet defining a bore with an axis, the bore having a shoulder at its upper end, the flange of the rotatable actuator arranged to cooperate with the shoulder of the bore to retain the rotatable actuator within the valve body, at least a portion of the valve element being slidably disposed within and against the bore, at least part of the bore and of the valve element having engaging shapes which permit axial movement of the valve element in the bore and prevent rotation of the valve element in the bore, wherein the bore and the valve element are hexagonal in cross section, and
   a second valve element; and
   a second valve seat,
   wherein the assembly is configured to provide a first flow path from the inlet to the outlet when the first valve element is disengaged from the first valve seat and to provide a second flow path from the inlet to the outlet when the second valve element is disengaged from the second valve seat, wherein upon rotation of the actuator to open the valve, initially the first valve element disengages from the first valve seat to permit fluid flow through the first flow path in order to equalise upstream and downstream pressure on the second valve element, and further rotation of the actuator disengages the second valve element from the second valve seat to permit fluid flow through the second flow path.

* * * * *